United States Patent
Vutukuri et al.

(10) Patent No.: US 12,236,389 B2
(45) Date of Patent: Feb. 25, 2025

(54) SENDING REPORTS OF ASSET TRANSPORT STATUS

(71) Applicant: MALIKIE INNOVATIONS LIMITED, Dublin (IE)

(72) Inventors: Eswar Vutukuri, Havant (GB); Stephen John Barrett, Haywards Heath (GB)

(73) Assignee: Malikie Innovations Limited, Dublin (IE)

( * ) Notice: Subject to any disclaimer, the term of this patent is extended or adjusted under 35 U.S.C. 154(b) by 235 days.

(21) Appl. No.: 17/184,798

(22) Filed: Feb. 25, 2021

(65) Prior Publication Data

US 2021/0192445 A1 Jun. 24, 2021

Related U.S. Application Data

(63) Continuation of application No. 15/372,367, filed on Dec. 7, 2016, now Pat. No. 10,936,990.

(51) Int. Cl.
*G06Q 10/0833* (2023.01)
*H04W 4/029* (2018.01)
*H04W 4/35* (2018.01)

(52) U.S. Cl.
CPC ........ *G06Q 10/0833* (2013.01); *H04W 4/029* (2018.02); *H04W 4/35* (2018.02)

(58) Field of Classification Search
CPC ................................................. G06Q 10/0833
See application file for complete search history.

(56) References Cited

U.S. PATENT DOCUMENTS

| | | |
|---|---|---|
| 6,982,656 B1 | 1/2006 | Coppinger |
| 8,830,124 B1 | 9/2014 | Akbari |
| 9,451,513 B2 | 9/2016 | Hole |
| 9,716,643 B2 | 7/2017 | Chan |
| 10,341,818 B2 | 7/2019 | Vutukuri |

(Continued)

FOREIGN PATENT DOCUMENTS

| | | | | |
|---|---|---|---|---|
| AU | 2006315220 A1 | * | 7/2008 | ............. H04B 17/27 |
| CN | 203951235 U | * | 11/2014 | |

(Continued)

OTHER PUBLICATIONS

3GPP TS 36.304 V14.4.0, Technical Specification, 3rd Generation Partnership Project; Technical Specification Group Radio Access Network; Evolved Universal Terrestrial Radio Access (E-UTRA); User Equipment (UE) procedures in dle mode (Release 14) (Sep. 2017) (49 pages).

(Continued)

*Primary Examiner* — Akiba K Robinson
(74) *Attorney, Agent, or Firm* — Botos Churchill IP Law LLP

(57) ABSTRACT

In some examples, a device includes a processor configured to compare a current transport status of the asset to a predicted transport status of the asset at each respective time instance of a plurality of time instances, and in response to determining that the current transport status does not differ from the predicted transport status by greater than a specified threshold, skip sending a report relating to the current transport status to a service over a network at the respective time instance of the plurality of time instances.

18 Claims, 8 Drawing Sheets

(56) References Cited

U.S. PATENT DOCUMENTS

| | | |
|---|---|---|
| 2003/0233189 A1 | 12/2003 | Hsiao |
| 2008/0012695 A1 | 1/2008 | Herschell |
| 2008/0294334 A1 | 11/2008 | Jo |
| 2010/0178928 A1 | 7/2010 | O'Reilly |
| 2010/0332131 A1 | 12/2010 | Horvitz |
| 2011/0312333 A1 | 12/2011 | I'Anson |
| 2013/0100819 A1 | 4/2013 | Anchan |
| 2013/0150028 A1 | 6/2013 | Atkins et al. |
| 2015/0173008 A1 | 6/2015 | Siddam |
| 2015/0192679 A1 | 7/2015 | Stinson |
| 2015/0256993 A1 | 9/2015 | Bellamkonda |
| 2015/0314776 A1 | 11/2015 | Yu |
| 2016/0300183 A1 | 10/2016 | Berger |
| 2017/0006512 A1 | 1/2017 | Hole |
| 2018/0047091 A1 | 2/2018 | Ogden |
| 2018/0137086 A1 * | 5/2018 | Stolpman ................ G01S 17/04 |

FOREIGN PATENT DOCUMENTS

| | | | | |
|---|---|---|---|---|
| EP | 2088807 | A2 | | 8/2009 |
| JP | 2004298325 | A | * | 10/2004 |
| TW | 201106741 | A | * | 2/2011 ............. H04W 8/22 |
| TW | 201243528 | A | * | 11/2012 ............. G05B 13/02 |
| WO | WO-9624915 | A1 | * | 8/1996 ............. G01C 21/26 |
| WO | WO-2008137479 | A2 | * | 11/2008 ............. H04W 12/08 |

OTHER PUBLICATIONS

GSM Association, Non-confidential Official Document SGP.02—Remote Provisioning Architecture for Embedded UICC Technical Specification, Remote Provisioning Architecture for Embedded UICC Technical Specification, Version 3.2, Jun. 27, 2017 (309 pages).

European Patent Office, International Search Report and Written Opinion for PCT/EP2017/081442 dated Feb. 2, 2018 (18 pages).

European Patent Office, Communication pursuant to Article 94(3) EPC for Appl. No. 17811535.8 dated Nov. 30, 2020 (5 pages).

* cited by examiner

SENDING REPORTS OF ASSET TRANSPORT STATUS

CROSS REFERENCE TO RELATED APPLICATION

This is a continuation of U.S. application Ser. No. 15/372,367, filed Dec. 7, 2016, U.S. Pat. No. 10,936,990, which is hereby incorporated by reference.

BACKGROUND

Trucks, tractor-trailers, or tractors that are connected to chassis for carrying containers can be used to transport cargo that includes goods. Cargo can be transported from an origin (such as a factory, a warehouse, a retail outlet, etc.) to a destination (such as retail outlet, a warehouse, customer premises, etc.) along a route.

BRIEF DESCRIPTION OF THE DRAWINGS

Some implementations of the present disclosure are described with respect to the following figures.

DETAILED DESCRIPTION

Figure 1:
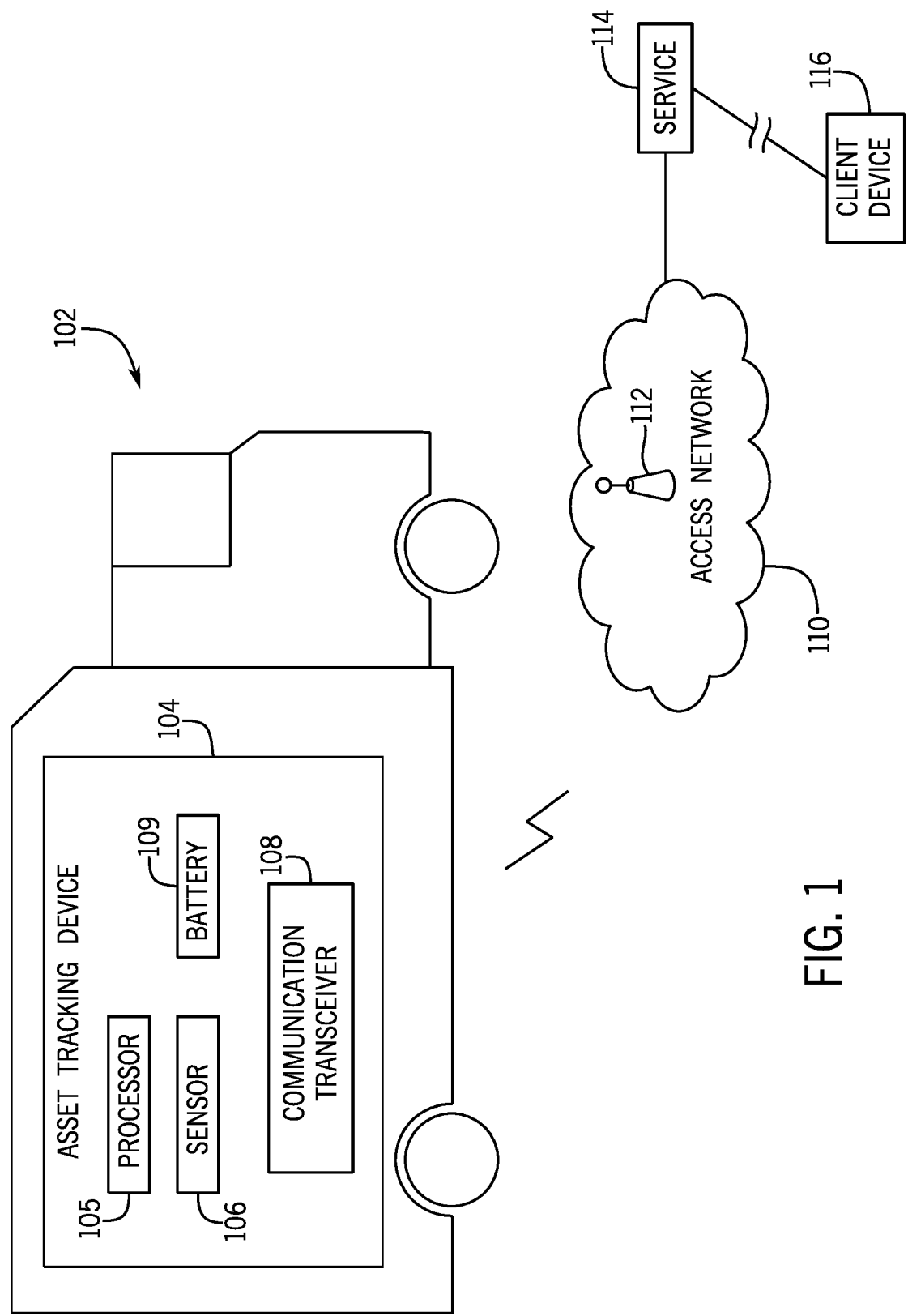
FIG. 1 is a block diagram of an example arrangement that includes an asset tracking device and a remote service, according to some implementations.

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A moveable platform can be used to carry physical items (also referred to as "assets") between different geographic locations. For example, the moveable platform can be a container (that is attached to a tractor), a truck, or a trailer, where the container provides an enclosed space in which the physical items can be stored during shipment. In other examples, the moveable platform can include another type of carrier structure that is able to carry physical items. More generally, the moveable platform can be part of, mounted on, or attached, as applicable, to a vehicle, such as a truck, a trailer, a tractor, a car, a train, a ship, an airplane, and so forth.

An entity such as a shipper, a distributor, a manufacturer, a seller of goods, or any other entity may wish to track assets (such as cargo) that are being transported using moveable platforms. To do so, an asset tracking device can be mounted on a moveable platform. An asset tracking device refers to an electronic device that is able to perform tracking of a transport status as well as other information relating to an asset that is carried by a moveable platform. The asset tracking device can include a sensor or multiple sensors to acquire certain sensor information. The transport status can include a current location of an asset that is being tracked by the asset tracking device, an estimated (expected) time of arrival of the asset that is tracked by the asset tracking device, or any other information that relates to the transport of the asset.

A current location can include a global positioning system (GPS) location, a location derived based on triangulation of signals from base stations or other wireless access network nodes, or other types of location information. The current location changes as the asset is moved by a moveable platform.

An estimated time of arrival of an asset refers to a time that the asset is expected to arrive at a specified destination. During transport, the estimated time of arrival can change (increase or decrease), such as due to unexpected delays, faster than expected travel times of a moveable platform, or other factors.

Examples of other information that can be communicated by an asset tracking device includes any or some combination of the following: a load status of a moveable platform (e.g., whether or not a moveable platform is loaded with asset(s) or an amount of loading of the moveable platform, e.g., 25% loaded, 50% loaded, etc.), conditions of the environment around the asset(s) (e.g., a measured temperature, a measured humidity, etc.), or other information that can be acquired by sensor(s).

Each of multiple asset tracking devices on various moveable platforms can communicate a transport status and other sensor information over a network to a remote service to allow the remote service to track assets that are being moved by the moveable platforms. The remote service can include a server or a collection of servers and associated network equipment that may be located at one fixed location or in a mobile device or as part of a data center or cloud. Alternatively, the remote service can include program code executed in a system, such as a cloud system or other type of system, that includes a computer or a distributed arrangement of computers. Asset tracking can involve tracking of any or some combination of the following: current locations of the assets, estimated time of arrival of assets, cargo load status of moveable platforms, conditions of the environment around the assets (where such conditions can include a measured temperature, a measured humidity, etc.), and/or other information.

An asset tracking device can include a communication component to communicate over a network. In some examples, asset tracking devices mounted on moveable platforms can be part of a larger network of devices. This larger network of devices can be part of the "Internet-of-Things" (IoT) technology paradigm to allow different types of devices to communicate different types of data (including sensor data, voice data, video data, e-mail data, picture or image data, messaging data, web browsing data, and so forth). In addition to network traffic communicated by computers, smartphones, wearable devices, and the like, the IoT technology paradigm contemplates that other types of devices, including household appliances, vehicles, sensor devices, thermostats, and so forth, have connectivity to a network to allow the devices to communicate respective data.

More generally, asset tracking using network connected asset tracking devices can involve acquiring transport status information and/or sensor information, transmitting the transport status information and/or sensor information, and aggregating such transport status information and/or sensor information or producing other measures based on the transport status information and/or sensor information to determine information associated with the assets that are being transported by moveable platforms. Based on data received from the asset tracking devices, a service can update a database, run analytics, and/or present status information for display, such that further decisions or actions can be performed. The asset tracking can be used to improve fleet utilization, reduce operating cost, reduce loss of assets due to theft, and so forth.

An asset tracking device may be run using a battery that may have to last a relatively long period of time (e.g., many years) without recharge. As a result, it is desirable to reduce power consumption of the asset tracking device to the extent possible. In examples where the communication component of the asset tracking device is a cellular modem or other type of wireless transceiver, a significant amount of time can be spent in the initial access of a cellular access network or other type of wireless access network to gain wireless communication service to allow the asset tracking device to send a report to a remote service.

An example cellular access network can operate according to the Long-Term Evolution (LTE) standards as provided by the Third Generation Partnership Project (3GPP). The LTE standards are also referred to as the Evolved Universal Terrestrial Radio Access (E-UTRA) standards. In other examples, other types of cellular access networks can be employed, such as second generation (2G) or third generation (3G) cellular access networks, such as a Global System for Mobile (GSM) cellular access network, an Enhanced Data rates for GSM Evolution (EDGE) cellular access network, a Universal Terrestrial Radio Access Network (UTRAN), a Code Division Multiple Access (CDMA) 2000 cellular access network, and so forth. In further examples, cellular access networks can be fifth generation (5G) and beyond cellular access networks. In additional examples, a wireless access network can include a wireless local area network (WLAN), which can operate according to the Institute of Electrical and Electronic Engineers (IEEE) 802.11 or Wi-Fi Alliance Specifications. In other examples, other types of wireless access networks can be employed by asset tracking devices to communicate with a remote service, such as a Bluetooth link, a Zigbee network, and so forth.

In a cellular access network, the asset tracking device can perform various operations to establish a connection with a cellular access network such that the asset tracking device can perform communications of application data (including transport status information and/or other sensor information) over the cellular access network. For example, the asset tracking device can perform a Received Signal Strength Indicator (RSSI) scan to measure a received signal strength in a frequency band of interest. The asset tracking device can then identify specific channels of interest in which a received signal strength is above a predetermined threshold, and select those channels for further processing. In each selected channel, the asset tracking device decodes synchronization signals to perform synchronization with identified cells of the cellular access network. The asset tracking device also reads certain system information, and decodes such system information for each identified cell. The asset tracking device can then perform cell and public land mobile network (PLMN) selection to identify the best cell belonging to a preferred PLMN and camps on the cell. Upon selecting a suitable cell, the asset tracking device performs a random access procedure and an attach procedure. Subsequent to attaching to the network, the asset tracking device can transmit and receive application data, such as transport status and/or sensor information.

The foregoing sequence of tasks to establish a connection between the asset tracking device and a cellular access network is both time consuming and can consume a large amount of power, particularly if performed multiple times to send multiple reports.

Establishing connections with other types of wireless networks can similarly be time consuming and can consume a relatively large amount of power at the asset tracking device.

In some examples, when performing asset tracking, an asset tracking device can send reports to a remote service over a network at predetermined times. Such predetermined times can be periodic times, where the asset tracking device sends a report after each periodic time interval. In other examples, the asset tracking device can send reports at other scheduled times. A "report" can refer to any collection of information (send in one or more messages or one or more data units).

The periodicity of reports transmitted by the asset tracking device to the remote service can be based on whether or not the moveable platform on which the asset tracking device is mounted is moving and can be configurable. For example, the asset tracking device can send reports as frequently as every 15 minutes when the moveable platform is in motion. In other examples, such as when the moveable platform is not in motion or is moving slowly, the asset tracking device can send reports at longer time intervals.

The asset tracking device can keep its wireless transceiver (e.g., cellular modem or other type of wireless transceiver) off between the predetermined times at which reports are sent, or alternatively, the asset tracking device can maintain the wireless transceiver on (but in a lower power mode) between sending reports. In either case, there can be substantial power consumption at the asset tracking device when sending reports, which can deplete the battery of the asset tracking device in implementations where the asset tracking device is battery-powered. When the wireless transceiver is turned off between sending of reports, the asset tracking device has to go through a connection procedure to connect to a wireless access network before a report can be sent. On the other hand, when the wireless transceiver is maintained in the on state between sending of reports, the wireless transceiver consumes power when sending reports even though the wireless transceiver may be in a lower power mode.

FIG. 1 is a block diagram of an example arrangement that includes a moveable platform 102 on which an asset tracking device 104 is mounted. Although not shown, the moveable platform 102 also carries an asset (or multiple assets). The asset tracking device 104 includes a sensor 106 and a communication transceiver 108 (such as a cellular modem or other type of wireless transceiver). The communication transceiver 108 includes a transmitter (to transmit data) and a receiver (to receive data). Although just one sensor 106 is shown, it is noted that the asset tracking device 104 can include multiple sensors, for acquiring respective different information. In some examples, the sensor 106 can include a GPS receiver to acquire a GPS location of the asset tracking device 104. In other examples, the sensor 106 can derive a position of the asset tracking device 104 based on triangulation of signals received from wireless access network nodes (e.g., base stations of a cellular access network or access points of a WLAN).

The sensor(s) 106 can also acquire other information, such as environmental information (e.g., temperature, humidity, etc.), information of a speed of the moveable platform 102, a load status of the moveable platform, and so forth.

FIG. 1 also shows an access network 110, which can be a cellular access network, a WLAN, or another type of wireless access network. The access network 110 includes a wireless access network node 112, which can be a cellular base station or other type of wireless access network node, such as an access point (AP) of a WLAN that operates according to the IEEE 802.11 standards. The access network 110 can include multiple wireless access network nodes 112.

As the moveable platform 102 moves between different locations, the asset tracking device 104 is able to communicate with different wireless access network nodes or with different access networks.

The access network 110 is coupled to a service 114 that is to receive and process asset tracking information transmitted by the asset tracking device 104. The service 114 can include one or more physical servers, or can include program code executed on one or multiple computers.

The asset tracking device 104 includes a processor 105, which can include any or some combination of the following: a microprocessor, a core of a multi-core microprocessor, a microcontroller, a programmable gate array, a programmable integrated circuit device, or any other hardware processing circuit.

The asset tracking device 104 also includes a battery 109 to provide power to various electronic components of the asset tracking device 104, such as the processor 105, the sensor 106, the communication transceiver 108, and so forth.

As further shown in FIG. 1, a client device 116 can communicatively couple to the service 114, to access information stored by the service 114. The client device 116 can include any of the following: a desktop computer, a notebook computer, a tablet computer, a smart phone, a wearable device (a smart watch, smart eyeglasses, a head-mounted device, etc.). A user can use the client device 116 to access status tracking information (reported by asset tracking devices) from the service 114, access results (e.g., reports, notifications, etc.) based on status tracking information reported by asset tracking devices, and so forth.

Figure 2A:
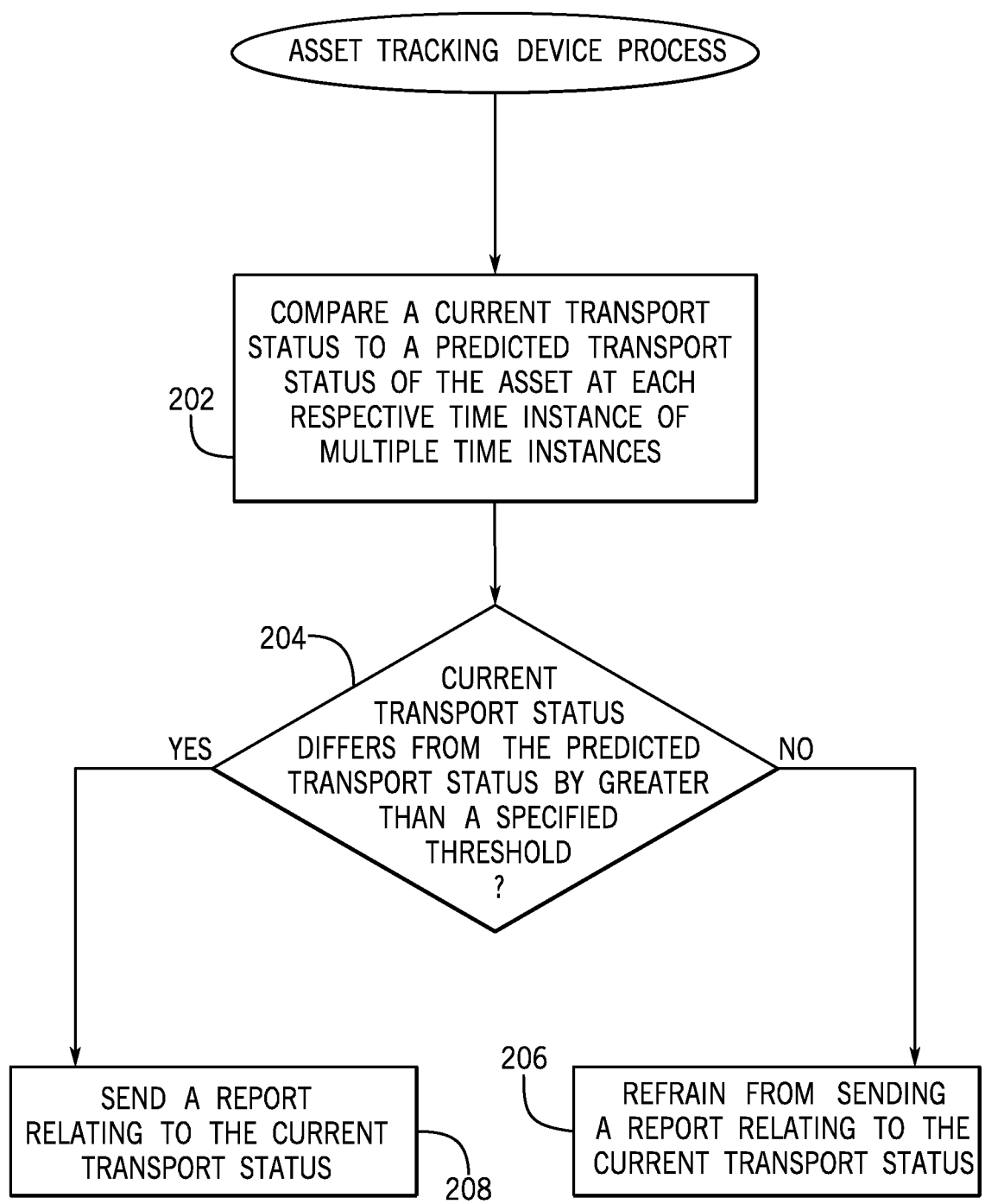
FIGS. 2A and 2B are flow diagrams of example processes performed by an asset tracking device according to some implementations.

FIG. 2A is a flow diagram of a process that can be performed by an asset tracking device, such as the asset tracking device 104. More specifically, the process of FIG. 2A can be performed by the processor 105 in the asset tracking device 104. In some examples, machine-readable instructions are executable on the processor 105 to perform the tasks of FIG. 2A. In other examples, the processor 105 can be implemented entirely using hardware to perform the tasks of FIG. 2A.

According to FIG. 2A, it is assumed that the processor 105 is able to send multiple reports of transport statuses of an asset at respective time instances (e.g., at periodic intervals or at non-periodic times). The transport status included in each report is the current transport status of the asset at the time that (or close in time to when) the report was sent.

The processor 105 compares (at 202) a current (actual) transport status to a predicted transport status of the asset at each respective time instance of multiple time instances. The "current transport status" can refer to an updated transport status that is measured or derived by the processor 105 at a current respective time instance. The predicted transport status can include a predicted location of the asset at a particular time, or an estimated time of arrival of the asset, or any other predicted information that relates to the transport of the asset. The predicted transport status can be computed by the asset tracking device 104, or alternatively, can be computed by the remote service 114 and transmitted to the asset tracking device 104 by the service 114.

The processor 105 determines (at 204) whether the current transport status differs from the predicted transport status by greater than a specified threshold. The specified threshold can be a threshold statically or dynamically set by the asset tracking device 104, or that is received by the asset tracking device 104 from the remote service 114. By doing this, the processor 105 determines whether the predicted transport status is accurate or not. In other words, if the predicted transport status differs from the current transport status by greater than the specified threshold, then the predicted transport status is determined to be not sufficiently accurate. On the other hand, if the predicted transport status differs from the current transport status by less than the specified threshold, then the predicted transport status is determined to be sufficiently accurate.

If the current transport status does not differ from the predicted transport status by greater than the specified threshold, then the processor 105 refrains from or skips (at 206) sending a report relating to the current transport status (referred to as a "current transport status report") to the service 114 over the access network 110 at the respective time instance of the multiple time instances. Note that refraining from sending the current transport status report at a corresponding time instance can refer to refraining from sending a current transport status report at one corresponding time instance, or refraining from sending current transport status reports at multiple corresponding time instances. Refraining from sending the current transport status report allows the communication transceiver 108 to be maintained in an inactive state (powered off or in some other lower power state), so that the communication transceiver 108 does not have to engage in a procedure to establish a connection with a wireless access network node to transport the application data. Alternatively, if the asset tracking device 104 is at a higher power mode, the asset tracking device 104 can be transitioned from the higher power mode to a lower power mode in response to determining that the sending of a current transport status report can be skipped.

However, if the current transport status differs from the predicted transport status by greater than the specified threshold, then the processor 105 sends (at 208) a current transport status report to the service 114 over the access network 110 at the the respective time instance of the multiple time instances.

Using techniques according to some implementations, the asset tracking device 104 may skip one or more scheduled current transport status reports as long as respective one or more predicted statuses are sufficiently accurate (as explained above). As an example, if the asset tracking device 104 is moving along a freeway or highway, the prediction accuracy may be higher, which can allow for skipping of the sending of multiple current transport status reports. Each time an asset tracking device 104 skips the sending of a current transport status report at a scheduled time, asset tracking device 104 saves power consumption the asset tracking device 104 would have otherwise incurred to establish a connection with an access network.

As the prediction algorithm improves (learns from the determination of accuracy of past predictions of transport statuses when compared to actual transport statuses, learns from planned route, learns from knowledge of traffic, etc.), predicted transport statuses can become more accurate, such that less current transport status reports would have to be sent, leading to greater savings in power consumption.

In general, solutions according to some implementations of the present disclosure determine one or more (up to M, M≥1) predicted locations, or previously predicted estimated times of arrival, or other predicted transport statuses, of the asset tracking device 104 corresponding to the next one or more (up to M) scheduled reporting times. The asset tracking device 104 triggers the sending of a current transport status report only if the predicted location, previously predicted estimated time of arrival, or other predicted transport status deviates from a current location, current estimated time of arrival, or other current transport status by greater than a specified threshold at the scheduled reporting time.

The sending of a current status report is thus based on the accuracy of predicted transport status made previously. As a result, if predicted transport statuses are accurate and the sending of a current transport status report is skipped, then the asset tracking device 104 can maintain its communication transceiver 108 in an inactive state for power savings.

If multiple metrics representing respective current transport statuses of an asset are reported, then the triggering of the sending of a current transport status report can be based on multiple thresholds for the respective metrics. For instance, if at least one of the actual measured metrics (e.g., location, estimated time of arrival, etc.) deviates more than a specified threshold relative to a predicted value of that metric, then the sending of a current transport status report may be triggered. As another example if more than a predetermined number of actual measured metrics deviate from their predicted values by more than their corresponding thresholds (one threshold for each metric is assumed in this case), then a current transport status report is triggered.

A specified threshold used in the comparison for triggering the sending of a current transport status report can also be referred to as a prediction tolerance value (PTV).

The magnitude of the PTV is a system parameter which may be chosen as a tradeoff between overall power consumption and accuracy of the current transport status reports. The PTV may be static (the same for the entire life of use of the asset tracking device 104) or the PTV may be varied dynamically depending on the varying demand for higher or lower accuracy of tracking status information. As an example, in an area where higher accuracy of the current status of an asset is important (e.g., areas notorious for crime or theft, etc.), the PTV may be reduced to ensure higher accuracy of the reported current status.

As an extension of this concept, in some examples, the PTV may be set equal to zero, meaning that a current transport status report is generated at each periodic instance irrespective of prediction accuracy. On the other hand, if such a high accuracy of reporting is not desired, the PTV may be increased. In the extreme case, if the next few current status updates can be skipped, the PTV may be set to infinity (or a very large value) for these few reporting instances. The PTV may either be determined locally at the asset tracking device 104 or the PTV may be provided by the service 114.

Further, the PTV may also depend on the type of asset tracking application. As an example, if the asset tracking application is deployed for tracking a more sensitive (e.g., expensive) asset, the PTV can be set to a lower value compared to an asset tracking application where a less sensitive asset is being tracked. Similarly, the PTV may also be used as a subscription differentiator; a lower PTV can be set for a customer paying a higher subscription fee, or alternatively, a higher PTV can be set for a customer paying a lower subscription fee. To compensate for a higher power consumption when using a lower PTV, the asset tracking device 104 may be fitted with a larger battery to provide the benefit of more accurate reporting.

1. Asset Tracking Solution Using Predicted Location Information

In the process of FIG. 2A, the asset tracking device 104 uses a predicted transport status to determine whether or not to send a report relating to a current transport status to the remote service 114. In this section (Section 1), reference is made to examples where the predicted transport status is a predicted location of the asset tracking device 104 at a future time. The predicted location can be derived by the processor 105 of the asset tracking device 104. In other examples, the predicted location can be derived by the remote service 114 instead of by the asset tracking device 104.

In examples of this section, the current transport status is a current (actual) location determined by the asset tracking device 104.

In some implementations, the asset tracking device 104 is able to predict the location of the moveable platform 102 at a future time based on one or more factors, including any one or some combination of the following: interpolation based on a past location or multiple past locations of the asset tracking device 104; prediction based on knowledge of a planned route of the moveable platform 102; information relating to traffic and/or weather along the planned route; and so forth.

In alternative implementations, the remote service 114 can predict the location of the moveable platform 102 using similar factor(s) as noted above, and the remote service 114 can transmit the predicted location to the asset tracking device 104.

Figure 2B:
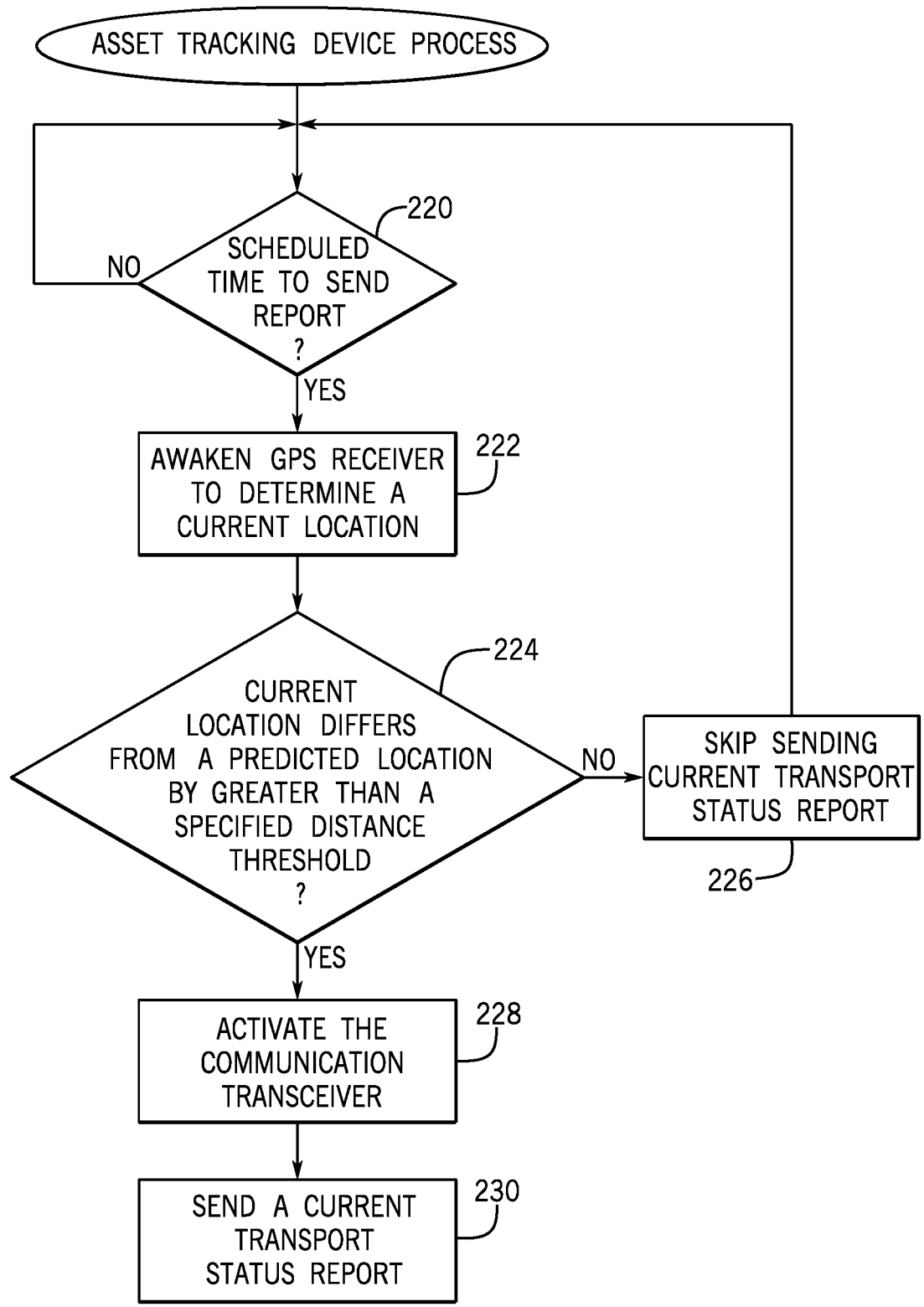

FIG. 2B is a flow diagram of an example process that can be performed by the asset tracking device 104 according to further implementations. The process of FIG. 2B can be performed by the processor 105 of the asset tracking device 104.

The process of FIG. 2B includes determining (at 220) whether a current time is a scheduled time to send a current transport status report. If so, the process awakens (at 222) a GPS receiver in the asset tracking device 104 to acquire GPS information to determine a current location of the asset tracking device 104.

The process next determines (at 224) whether the current location differs from a predicted location of the asset tracking device 104 by greater than a specified distance threshold (in the form of the PTV noted above, for example). If not, then the process skips (at 226) sending a current transport status report to the remote service 114.

However, if the current location differs from the predicted location of the asset tracking device 104 by greater than the specified distance threshold, then the process activates (at 228) the communication transceiver 108 of the asset tracking device 104, and sends (at 230) a current transport status report to the remote service 114, where the current transport status report includes the current location of the asset tracking device 104.

1.1 Predicted Location Information Derived by the Asset Tracking Device

In examples where predicted location information is computed by the asset tracking device 104, when the asset tracking device 104 sends a report of its current location (a current transport status report) to the remote service 114, the asset tracking device 104 can also report its predicted location (i.e., the location at which the asset tracking device 104 is likely to be located) at the next (one or more) scheduled reporting times. The number of reported predicted locations can depend on how confident the asset tracking device 104 is about the asset tracking device's prediction, such as based on traffic, type of road, time of day, and so forth. If the moveable platform 102 on which the asset tracking device 104 is mounted is on a freeway or highway (with no or few traffic lights and with light or normal traffic), the asset tracking device 104 can predict relatively far into the future. On the other hand, if the moveable platform 102 is on a city road with unpredictable traffic, the asset tracking device 104 may have a low confidence in its prediction, and as a result, the asset tracking device 104 can include fewer predicted locations at future time points in a report to the remote service 114.

The asset tracking device 104 can wake up from a lower power mode to a higher power mode at a scheduled reporting time and obtain its current location (such as by using measurements of a GPS receiver, measurements of signals from wireless access network nodes, etc.). Subsequently, the asset tracking device 104 can send a current transport status report if the obtained current location (at the scheduled reporting time) differs from the predicted location (for the scheduled reporting time) by greater than the specified threshold. The specified threshold can be a distance threshold that can be tailored to a given application or goal. For example, the distance threshold can be set lower to provide improved accuracy in reporting the location of the asset (more current transport status reports are sent but this comes at the expense of higher consumption), and can be set higher to reduce battery consumption (less current transport status reports are sent).

In some examples, when the asset tracking device 104 sends a current transport status report at a scheduled reporting time, in response to the current location exceeding the predicted location by greater than the distance threshold, the asset tracking device 104 can also send past locations of the asset tracking device 104 at times where sending of reports was skipped. Sending such past locations can help the remote service 114 to update predicted locations to a more accurate level of confidence.

In some examples, the client device 116 (FIG. 1) that is communicatively coupled to the service 114 can present a graphical user interface (GUI) visualization, to allow a user of the client device 116 to access information stored by the service 114. Such information stored by the service 114 can include locations of assets at corresponding times. The client device 116 can plot locations of assets, and possibly also can plot predicted locations of assets, in the GUI visualization. In some examples, actual locations can be represented with icons of a first representation such as a first color, while predicted locations can be represented with icons of a second representations such as a second color in the GUI visualization. When an actual location is obtained in a subsequent report, the GUI visualization can replace a predicted location with an actual location, and the corresponding representation (e.g. the color) of the icon can be replaced or updated accordingly.

Figure 3:
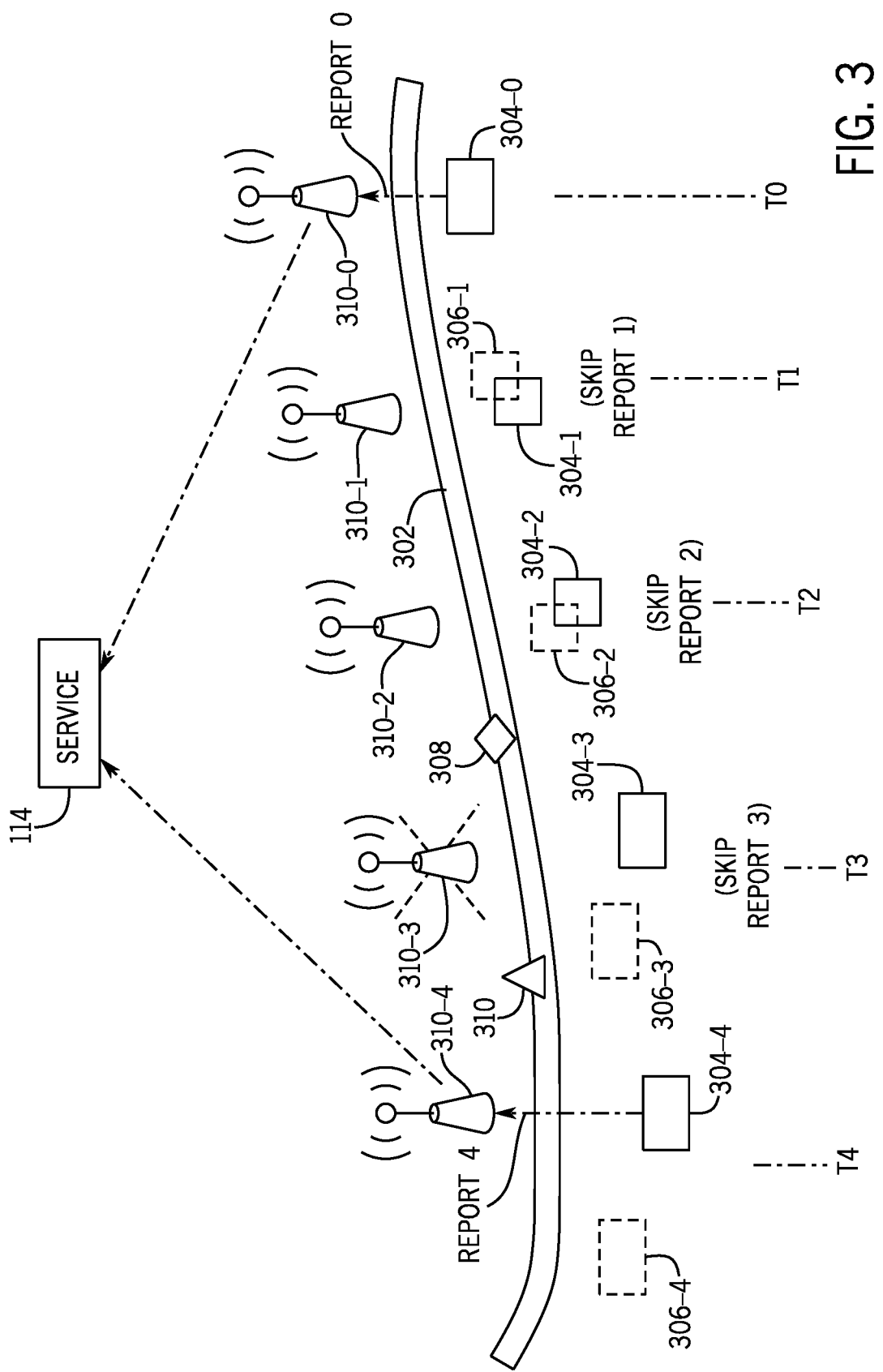
FIG. 3 illustrates an example of reporting or skipping the reporting of current status reports, according to some implementations.

FIG. 3 shows an example where the moveable platform 102 travels along a road 302 (from right to left in the figure). In FIG. 3, each solid rectangular box (304-0, 304-1, 304-2, 304-3, and 304-4) represents an actual location of the moveable platform 102, and each dashed box (306-1, 306-2, 306-3, and 306-4) represents a predicted location. Icons 308 and 310 represent traffic incidents along the road 302 that were unknown at the time (T0) that an initial current transport status report (Report 0) was sent by the asset tracking device 104 to the service 114 using a wireless access network node 310-0. FIG. 3 further shows additional wireless access network nodes 310-1, 310-2, 310-3, and 310-4 that can be used by the asset tracking device 104 to send current transport status reports (if triggered) to the remote service 114.

Report 0 includes the current location at time T0 (the time Report 0 is sent), as well as M predicted locations at M corresponding future time points, where M 1. In the example of FIG. 3, M=4, so that Report 0 includes 4 predicted locations at 4 corresponding future time points.

In FIG. 3, at time T1, the asset tracking device 104 compares the actual location 304-1 to the predicted location 306-1 for time T1, and determines that the actual location 304-1 does not differ from the predicted location 306-1 by greater than the specified distance threshold. As a result, the sending of Report 1 at time T1 is skipped.

At time T2, the asset tracking device 104 compares the actual location 304-2 to the predicted location 306-2 for time T2, and determines that the actual location 304-2 does not differ from the predicted location 306-2 by greater than the specified distance threshold. As a result, the sending of Report 2 at time T2 is skipped.

As a result of a traffic incident (308), the moveable platform 102 is delayed. Consequently, at time T3, the asset tracking device 104 determines that the actual location 304-3 differs from the predicted location 306-3 for time T3 by greater than the specified distance threshold. In response, the asset tracking device 104 should send Report 3 at time T3. However, in the example of FIG. 3, the asset tracking device 104 does not have a connection to the wireless access network node 310-3 (either because the asset tracking device 104 is outside the coverage area of the wireless access network node 310-3, or the asset tracking device 104 has lost its connection to the wireless access network node 310 for some other reason). Without a connection to the wireless access network node 310-3, the asset tracking device 104 skips the sending of Report 3. However, the asset tracking device may keep searching for a communication network in this case.

Later, at time T4, when the asset tracking device 104 has acquired a network coverage and hence the connection to the wireless access network node 310-4, the asset tracking device 104 sends Report 4 to the remote service 114. The sending of Report 4 can occur based on the fact that the sending of Report 3 was skipped due to lack of coverage.

Moreover, as shown in the example of FIG. 3, due to another traffic incident (310), the moveable platform 102 is delayed even further. Consequently, at time T4, the asset tracking device 104 determines that the actual location 304-4 differs from the predicted location 306-4 for time T4 by greater than the specified distance threshold, which would have triggered the sending of Report 4 anyway.

Even though the asset tracking device 104 does not have a connection to the wireless access network node 310-3 at a location when the scheduled current transport status report is to be sent (e.g., Report 3 in FIG. 3), the service 114 still has a predicted location (from Report 0) available until the asset tracking device 104 sends the next current transport status report. When the service 114 sends asset tracking information to the client device 116 (FIG. 1), the service 114 may tag a location information either as a predicted location information or an actual location information.

In some examples according to the present disclosure, if the asset tracking device 104 does not have a network connection at a location where a current transport status report is triggered, and if the difference between the predicted and actual locations is greater than the specified distance threshold, then the asset tracking device 104 stays awake to send a current transport status report as soon as the network connection is re-established.

In some examples, the specified distance threshold may be static. Alternatively, the specified distance threshold may vary over time based on one or more factors, such as the actual location, a battery level, and so forth. The following are examples of how the specified distance threshold can be varied:

- If the battery level is low, increase the threshold to reduce the number of current transport status reports and increase power savings. If the battery level is high, the threshold can be decreased to increase the number of current transport status reports.
- If the actual location indicates that the moveable platform 102 is in a geographic area that is known to be safe (less occurrences of theft), then the threshold can be increased to save battery. If the actual location indicates that the moveable platform 102 is in a high theft area, then the threshold can be decreased to trigger a larger number of current transport status reports. Thus, the threshold can be based on a safety status of a location, where the safety status can refer to a likelihood of theft or loss of the asset.
- The threshold can vary as a function of whether or not the asset tracking device 104 is in network coverage. If there is a relatively high expectation or probability that the asset tracking device 104 may be out of coverage at one or more predicted locations, a larger threshold value may be set to avoid awakening the asset tracking device 104 in a location of no coverage and performing network searching). Once the asset tracking device 104 is back in coverage, the asset tracking device 104 will report the actual location.
- Note that increasing the threshold means that there is slightly more uncertainty in the predicted location. However, location information (e.g., predicted location information) is still available to client devices accessing the service 114.
- The threshold can be varied based on application or use case.
- The threshold can be varied based on actual proximity to the destination. For example, more accuracy in location information may be desirable the closer the asset tracking device 104 is to the destination.
- The threshold can be varied based on estimated time of arrival or proximity to a destination. For example, less accuracy can be tolerated when the estimated time of arrival is 10 hours in the future versus when the estimated time of arrival is half an hour in the future.
- The threshold can be varied based on expected average speed at the predicted location. For example, if the moveable platform 102 is on a freeway, the tolerance can be set higher than when the moveable platform 102 is on a city road.
- The threshold can be varied based on the number of skipped current transport status reports.

1.2 Predicted Location Information Derived by the Remote Service

In Section 1.1 above, reference is made to predicted location information derived by the asset tracking device 104. In this section (Section 1.2), examples are described where the predicted location information is derived by the remote service 114 and sent by the service 114 to the asset tracking device 104.

More generally, instead of using the asset tracking device 104 to predict a transport status, the service 114 can be used to compute the predicted transport status.

In this solution, the asset tracking device 104 triggers the sending of an initial report (e.g., Report 0 in FIG. 3). However, unlike the solution in Section 1.1, in this case, the service 114 does the prediction and may, in response to the location report from the asset tracking device 104, or independently, generate and transmit one or more predicted locations (at the next few scheduled reporting times). The service 114 may also indicate one or more specified thresholds to use for determining whether or not to trigger the sending of a scheduled current transport status report.

The process run at the asset tracking device 104 to generate next current transport status reports is then similar to the process described in Section 1.1.

Some example benefits of performing location prediction (or other transport status prediction) at the service 114 rather than at the asset tracking device 104 can include the following:

- The prediction process is performed centrally at the service 114 and can be upgraded or modified (without updating the program code on asset tracking devices.
- The service 114 can leverage more information (e.g., traffic information, etc.) to predict locations or other transport statuses, as the service 114 may have more ready access to sources of such information, as compared to the asset tracking device 104 itself.
- Running the prediction process and information retrieval at the asset tracking device 104 may result in additional power consumption, whereas if the prediction process and information retrieval were obtained at the service 114, the asset tracking device 104 would not have to perform such tasks.

1.3 Generating a Predicted Location

In some examples, a predicting entity (either the asset tracking device 104 or the service 114) can use the asset tracking device's current actual location determined at a reporting time to generate predicted location(s) corresponding to the next (M) reporting instance(s). The predicting entity can generate a periodic report every N minutes. Thus, at the time of any given current transport status report, the predicting entity knows when the next current transport status report will be triggered. Based on this, and by using the knowledge of the current location of the asset tracking device, it is possible for the predicting entity to predict a future location(s) at which the asset tracking device 104 is likely to be at the time of the next reporting instance(s). In general, one or more of the following factors may be used by the predicting entity to generate a predicted location corresponding to a future reporting instance:

- The time at which the future report will be generated.
- The current location (i.e., location at the time of generating the prediction).
- Past location history (this may include locations at which the asset tracking device 104 was in the past including the locations at the time of past reporting instances).
- Knowledge of a planned route or route information.

Knowledge of traffic incidents or traffic volume that may impact the predicted location.

Knowledge of vehicle speed and direction of travel.

Weather and other factors that may affect the future location at the time of next report.

In other examples, further or alternative factors may be considered.

The task of generating the predicted location can be performed using any of a number of prediction techniques, such as a linear extrapolation or some other non-linear techniques that exploit the associated uncertainty with any specific location information used in the prediction algorithm such as Kalman filtering.

It should be noted that more than one predicted location can be generated at any given time. For instance, up to M predicted locations corresponding to future M periodic reporting times may be generated at a given point in time. It should be noted that a predicted location may or may not be accurate (i.e., may deviate from the actual location by more than a specified threshold) depending on various conditions. Further, a predicted location corresponding to a reporting time that is further into the future may be less accurate than a predicted location corresponding to a reporting time that is closer to the current time.

As the number of predicted locations increase, the likelihood of a predicted location deviating from an actual location by more than a specified threshold will also increase progressively.

The number M of predicted locations that are computed and reported can be chosen based on a tradeoff between power consumption and accuracy of reports. Thus, similar considerations apply to the value of M as those applicable for choosing the value of a specified threshold (e.g., a PTV). The value of M may be varied dynamically depending on varying demands for higher or lower accuracy of location information. As an example, in an area where higher accuracy of location reporting is important (e.g., areas notorious for crime or theft), the value of M may be reduced to ensure higher location prediction accuracy (and to ensure that more frequent current transport status reports are transmitted). In some examples, M may be set to 0, which means that a current transport status report is generated at each scheduled reporting time. On the other hand, if such a high accuracy of reporting is not desired, M may be increased in value. The value of the M may either be determined locally at the asset tracking device 104 or at the remote service 114 (which can then send the value of M to the asset tracking device 104).

Further, the value of M may also depend on the type of asset tracking application. As an example. if the asset tracking application is deployed for tracking a more sensitive (e.g., expensive) asset, the value of M can be set to a lower value compared to an asset tracking application where a less sensitive asset is being tracked. Similarly, the value of M may also be used as subscription differentiator. For example, a lower value of M is set for a customer paying a higher subscription fee, while a higher value of M is set for a customer paying a lower subscription fee. To compensate for higher power consumption when using a lower M value, the asset tracking device 104 may be fitted with a larger battery.

2. Asset Tracking Solution Using Estimated Time of Arrival

In some use cases, it may not be important for an entity that tracks assets to know exactly where an asset (or a moveable platform carrying the asset) is. Rather, the entity may wish to know about the estimated time of arrival of the asset, so that, for example, a loading bay in a warehouse can be allocated and prepared in advance of the arrival of the moveable platform carrying the asset.

As an alternative or in addition to providing periodic location information (actual location information and/or predicted location information), the entity can be provided with the current estimated time of arrival (ETA). In some examples, a user can use the client device 116 (FIG. 1) to select the type(s) of transport status that the asset tracking device 114 should report. For example, the client device 116 can have a GUI screen that allows the user to select reporting of any one or more of the following by the asset tracking device 104: location information, estimated time of arrival, or other transport status information.

Figure 4:
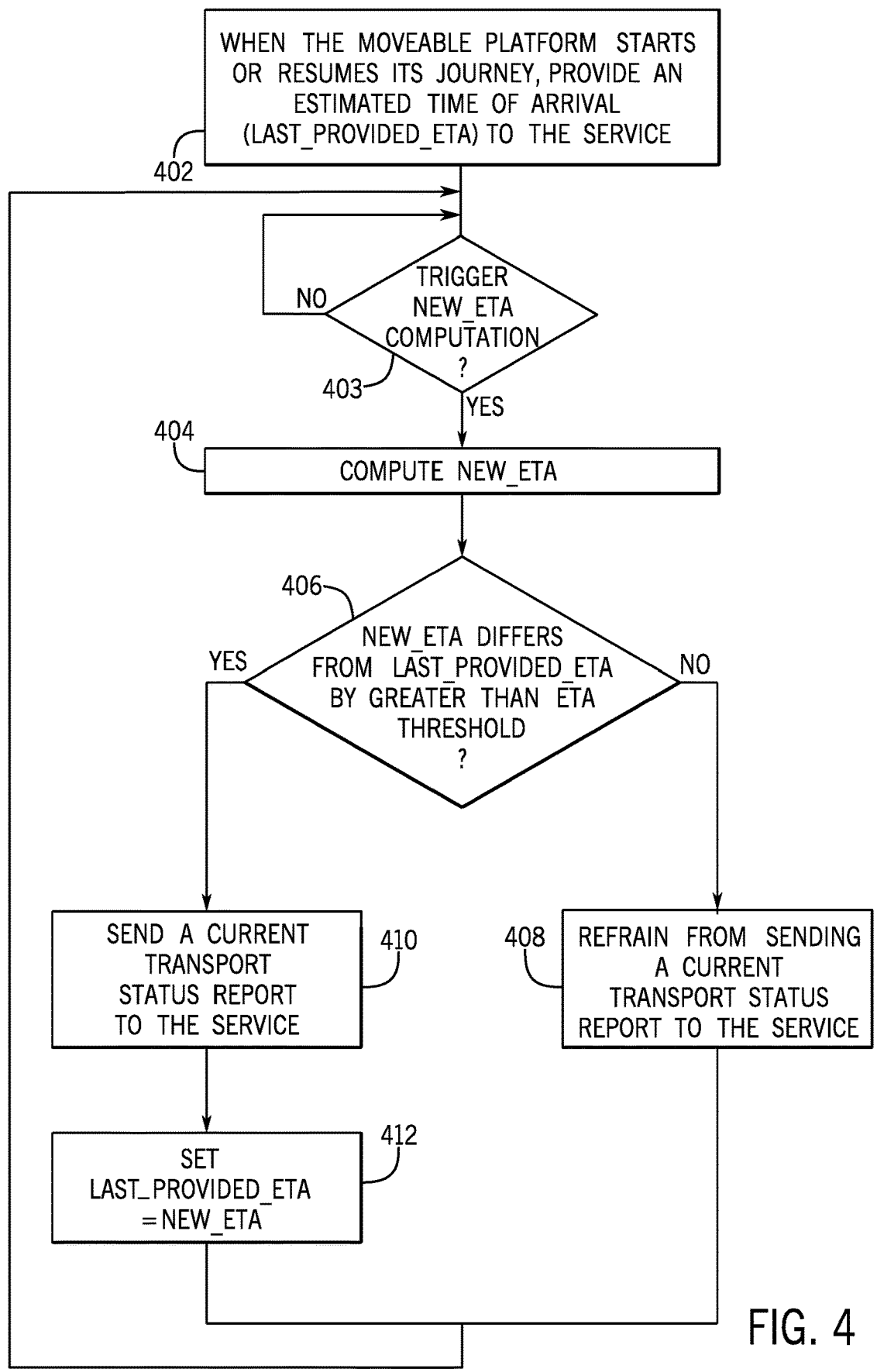
FIG. 4 is a flow diagram of an example process performed by an asset tracking device according to alternative implementations.

FIG. 4 illustrates an example process that can be performed by the asset tracking device 104 for reporting estimated times of arrival. When the moveable platform 102 starts or resumes its journey (e.g., starts moving after a period of being stationary), the asset tracking device provides (at 402) an estimated time of arrival to the service 114. This provided estimated time of arrival can be referred to as Last_Provided_ETA.

The estimated time of arrival that is provided can be computed by the asset tracking device 104 based on any one or some combination of the following factors: the moveable platform's current location, the moveable platform's current speed, information of a route and speed restrictions along the route, information regarding traffic or congestion on the route, information of weather conditions, information indicating restrictions on operation of the moveable platform (e.g., regulated maximum speed), and so forth.

The asset tracking device 104 also obtains an ETA threshold, which is an example of the specified threshold used in task 206 of FIG. 2A. The asset tracking device 104 can determine the ETA threshold, or alternatively, the asset tracking device 104 can receive the ETA threshold from the service 114. The ETA threshold can be varied based on one or more factors, such as based on an application, a use case, and so forth. The ETA threshold can be measured in time units, and defines the acceptable inaccuracy in estimated time of arrival prediction. An ETA threshold of ±10 minutes would mean that the estimated time of arrival that is reported is the estimated time of arrival plus or minus 10 minutes.

Next, the asset tracking device 104 determines (at 403) if a trigger to compute a new current estimated time of arrival (referred to as New_ETA) has occurred. For example, the New_ETA can be computed at a next scheduled time (periodic time or other scheduled time), at a specific location, on reception of information concerning road traffic congestion or worsening weather, or in response to any other trigger. If so, the asset tracking device 104 computes (at 404) the New_ETA.

The asset tracking device 104 determines (at 406) if the New_ETA differs from the Last_Provided_ETA by greater than the ETA threshold. If not, then the asset tracking device 104 refrains (at 408) from sending a current transport status report to the service 114.

However, if the New_ETA differs from the Last_Provided_ETA by greater than the ETA threshold, then the asset tracking device 104 sends (at 410) a current transport status report to the service 114, where the current transport status report includes the New_ETA as the provided estimated time arrival (Last_Provided_ETA to be used in the next iteration) of FIG. 4. The asset tracking device 104 then sets (at 412) Last_Provided_ETA equal to New_ETA.

A new ETA threshold may optionally be obtained at this point, e.g., as provided from the service 114 to the asset tracking device 104.

The process then returns to task 403 to iterate through tasks 403-412.

In alternative examples, an asymmetric ETA threshold can be used, where the asymmetric ETA threshold can be in the form of +M/−N time units, where M is different from N. In other words, the asset tracking device 104 triggers the sending of a current transport status report in response to New_ETA being greater than +M time units than Last_Provided_ETA, or in response to New_ETA being −N time units less than Last_Provided_ETA. In some examples, the use of an asymmetric ETA threshold may be useful if a warehouse manager or other entity does not care if the cargo arrives early (within some bound), but definitely wants to know if the cargo is going to arrive late (or vice versa).

In further examples, the ETA threshold can be set to be a dynamically decreasing function of the estimated time of arrival. For example, if the estimated time of arrival is 10 hours (or some other large time duration) in the future, then an ETA threshold of 1 hour may be adequate (from the perspective of an entity that is seeking the asset transport status). However, if the estimated time of arrival is 1 hour (or some other small time duration) in the future, then a smaller ETA threshold (e.g., 10 minutes) may be used to trigger more current status reports.

3. Aspects Related to Skipped Report

As explained above, a reduction in power consumption at the asset tracking device 104 can be accomplished by skipping the sending of current status reports when an actual current transport status is reasonably close in value to a predicted current transport status.

At any given time, the service 114 can have one or more of the following types of transport status information:

1. Actual transport status information in received current status reports sent by the asset tracking device 104. The actual transport status information is not predicted transport status information.
2. Predicted transport status information, which can be one of the following sub-types:
   a. A predicted transport status information corresponding to a past time instance. This past predicted transport status information can correspond to a reporting time where the sending of a current status report was skipped by the asset tracking device 104.
   b. A predicted transport status information corresponding to a future time instance. This future transport status information corresponds to reporting time that is in the future. The asset tracking device 104 may later transmit an actual transport status in a report at that reporting time (e.g., if the actual transport status differs from the predicted transport status by more than the specified threshold).

Figure 5:
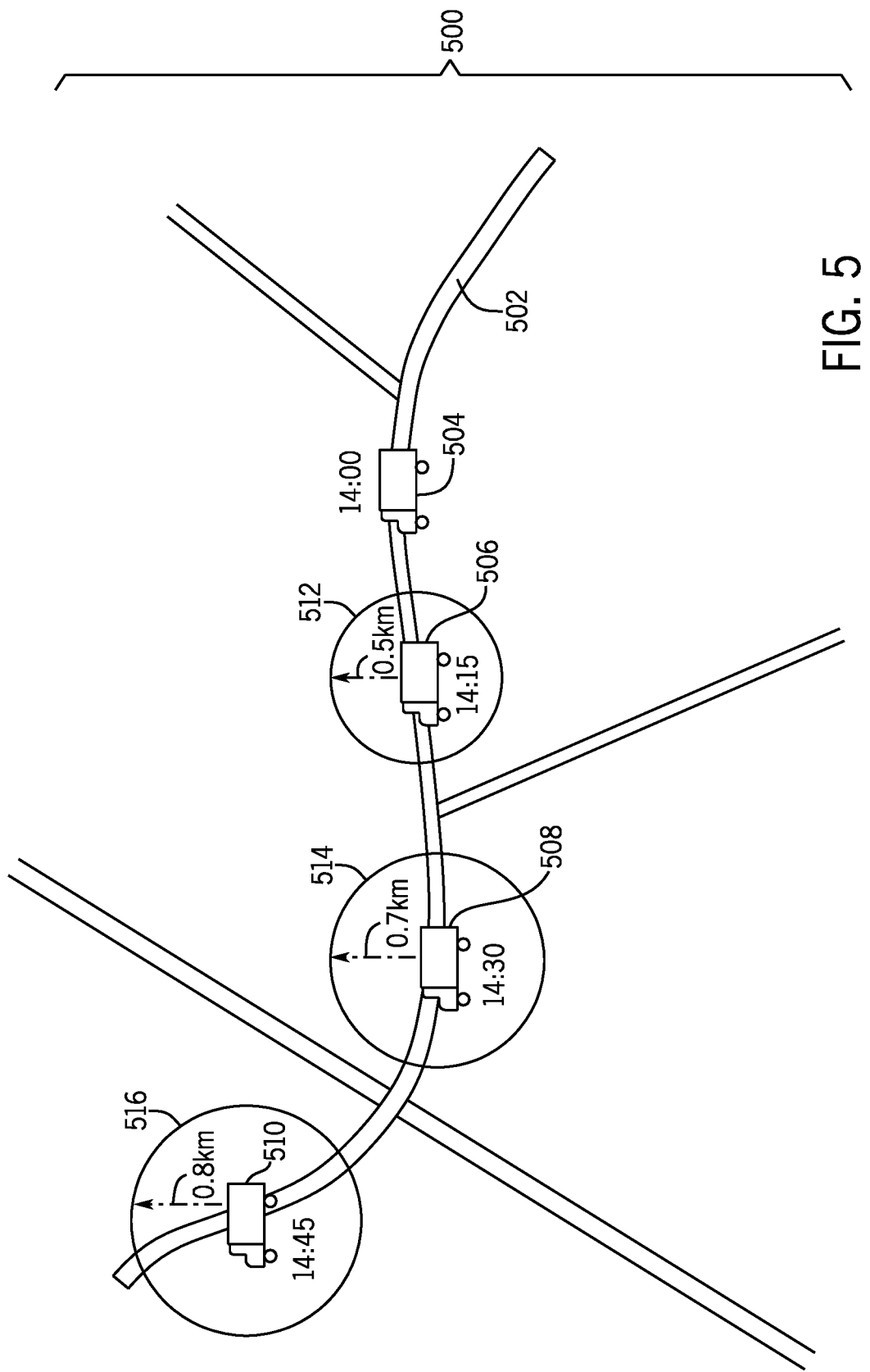
FIG. 5 illustrates a graphical user interface (GUI) visualization showing actual and predicted locations of an asset, according to some implementations.

FIG. 5 shows an example of a GUI visualization 500 that can be displayed based on information from the service 114. The GUI visualization 500 can be displayed at the client device 116, for example. The GUI visualization 500 includes a geographic map that shows a road 502 along which the moveable platform 102 is traveling.

The GUI visualization 500 shows an example where the displayed transport status information is location information (actual location information or predicted location information). When displaying location information, the service 114 may distinguish between the different types of location information in the displayed GUI visualization 500.

The GUI visualization 500 shows four locations 504, 506, 508, and 510 of an asset that is being tracked. The locations 504, 506, 508, and 510 are plotted as truck icons along the road 502 in the displayed map. The location 504 is an actual location (for time 14:00) received in a current status report from the asset tracking device 104. The locations 506, 508, and 510 are predicted locations for future time points, including 14:15, 14:30, and 14:45. Each predicted location 506, 508, or 510 is associated with a corresponding visible representation of uncertainty (e.g., in form of an uncertainty circle 512, 514, or 516, respectively, drawn around the respective predicted location.

In other examples, an uncertainty bar may be displayed instead of a circle for each predicted location. The size or length of the uncertainty bar can represent the respective amount of uncertainty associated with a predicted location displayed in the GUI visualization 500.

The radius of each circle 512, 514, or 516 can represent the expected uncertainty in the prediction. The radius of the circle 512 is 0.5 kilometers (km), the radius of the circle 514 is 0.7 km, and the radius of the circle 516 is 0.8 km. A larger circle indicates greater uncertainty in the respective predicted location. Note that if the route is known, the uncertainty of the location is along the known route (e.g., the road 502 shown in FIG. 5).

Assuming that the current time is between 14:15 and 14:30, then the predicted location 506 can be one where the sending of a current status report was skipped by the asset tracking device 104, such as due to a current location not differing from the corresponding predicted location (for time 14:15) by greater than a specified distance threshold. On the other hand, if the current time is between 14:15 and 14:30, then predicted locations 508 and 510 are future predicted locations for which current status reports are not yet due. In some examples, predicted locations displayed in the GUI visualization 500 associated with skipped reports can be displayed in a first representation, such as a first color, while predicted locations displayed in the GUI visualization 500 associated with future time points can be displayed in a second representation, such as a second color different from the first color. In other examples, other different visual indications can be used to distinguish between displayed predicted locations for which current status reports have been skipped and displayed predicted locations for future time points.

There can be a direct correspondence between the specified threshold (e.g., the PTV noted above) and the resulting uncertainty in the predicted location of an asset. The radius of an uncertainty circle can be set based on the corresponding specified threshold value, or alternatively, the length of an uncertainty bar may be based on the corresponding specified threshold value.

Note that the uncertainty can increase as a function of the number of skipped reports since the last report of actual location, so that the size of displayed uncertainty circles may gradually increase with increasing time into the future.

Failure to receive a current status report may be due to one of several reasons. A first reason is that the difference between predicted and actual locations is less than the specified threshold, which caused the asset tracking device 104 to skip the sending of the corresponding current status report. A second reason is that the difference between predicted and the actual locations is greater than the specified threshold, but a current status report has not yet been transmitted (e.g., due to lack of network connection) or a transmitted current status report was not successfully received at the service 114 (e.g., due to errors over the transmission medium, etc.).

In the case of lack of network connection or failure of successful communication (the second reason above), even though the service 114 may not have received actual current locations, the service 114 may still have predicted locations, which may be displayed to the user.

Since the service 114 also knows that a reporting time has passed, the service 114 knows that a corresponding report may have been skipped. If the service 114 also knows that wireless access network coverage exists at this location, the service 114 may conclude with a greater degree of certainty that a report has indeed been skipped. This greater degree of certainty can be indicated using a representation, such as a different color. As noted above, the service 114 can display predicted locations associated with skipped reports differently than predicted locations for future time points.

At the asset tracking device 104, the operation of the asset tracking device 104 differs depending on which of the first and second reasons above caused the skipping of a current status report. In the scenario where the first reason caused the skipping of a current status report, the asset tracking device 104 can maintain its communication transceiver 108 in an inactive state, and activates the communication transceiver 108 only at the next scheduled reporting time. However, in the scenario where the second reason caused the skipping of a current status report, the asset tracking device 104 can keep the communication transceiver 108 active, and can keep searching for a wireless access network until the communication transceiver 108 establishes a connection with a wireless access network. As soon as the communication transceiver 108 establishes a connection with a wireless access network, a new current status report can be transmitted by the asset tracking device 104.

Further, even when a report is skipped due to the difference between actual location and predicted location being less than the specified threshold, the asset tracking device 104 may still log the actual location information locally in the asset tracking device 104 (i.e., although this information is not reported to the service 114, the location information is not lost). Actual location information corresponding to skipped report(s) can then be transmitted eventually to the service 114 when a subsequent location report is transmitted.

Upon eventually receiving a current status report from the asset tracking device 104, the service 114 can refresh displayed locations (such as in the GUI visualization 500) using information in the received current status report. For example, predicted locations can be replaced with updated locations, and the corresponding visual indications can be updated accordingly in the GUI visualization 500.

Moreover, predicted locations displayed in the GUI visualization 500 can also be updated, either based on predicted locations included in a received current status report, or based on updated predictions made by the service 114 in response to receiving a current status report.

4. Signaling Between an Asset Tracking Device and a Service

Figure 6:
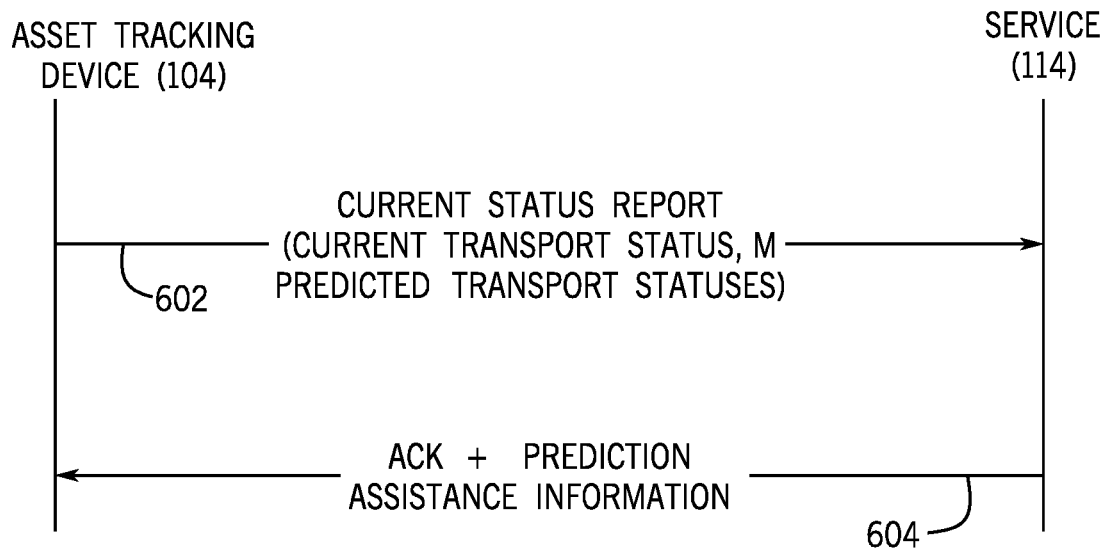
FIGS. 6 and 7 are message flow diagrams showing signaling between an asset tracking device and a service, according to further implementations.

In some examples, as shown in FIG. 6, when the asset tracking device 104 sends (at 602) a current status report to the service 114, the asset tracking device 104 can include the actual current transport status as well as up to M (M≥1) predicted transport statuses, in examples where the determination of predicted transport statuses is performed by the asset tracking device 104.

As further shown in FIG. 6, the service 114 responds to the current status report by sending (at 604) an acknowledgement (ACK) message as well as prediction assistance information to be used by the asset tracking device 104 to predict transport statuses. The prediction assistance information sent by the service 114 can include a value of M, a specified threshold (e.g., the PTV), and so forth. Sending the prediction assistance information with or as part of the acknowledgment message allows for more efficient usage of the communication transceiver 108 of the asset tracking device 104, since the communication transceiver 108 does not have to be separately activated to receive the acknowledgment and the prediction assistance information.

Although FIG. 6 shows the service 114 sending prediction assistance information with an acknowledgment message that is responsive to a current status report, it is noted that in other examples, the prediction assistance information can be separately sent by the service 114 to the asset tracking device 104, which may have occurred in the past. The prediction assistance information can be static, so that it is reported just once by the service 114. In other examples, the prediction assistance information can be dynamic and can be reported by the service 114 to the asset tracking device 104 multiple times.

In other examples, instead of receiving the value of M and/or PTV from the service 114, the asset tracking device 104 can locally determine the value of M and/or PTV.

FIG. 6 shows an example where the predicted transport statuses are computed by the asset tracking device 104 and sent in a current status report to the service 114. In alternative examples, the computation of predicted transport statuses is performed by the service 114.

A benefit of generating predicted transport statuses at the service 114 is that the information that is useful for generating the prediction may be obtained more easily by the service 114 than by the asset tracking device 104. As an example, obtaining information such as traffic and/or weather conditions may be performed without any additional power penalty to the asset tracking device 104 if the prediction is done at the service 114 (this is because the service 114 is located at a central location that has continual access to a network connected to various sources of information).

Figure 7:
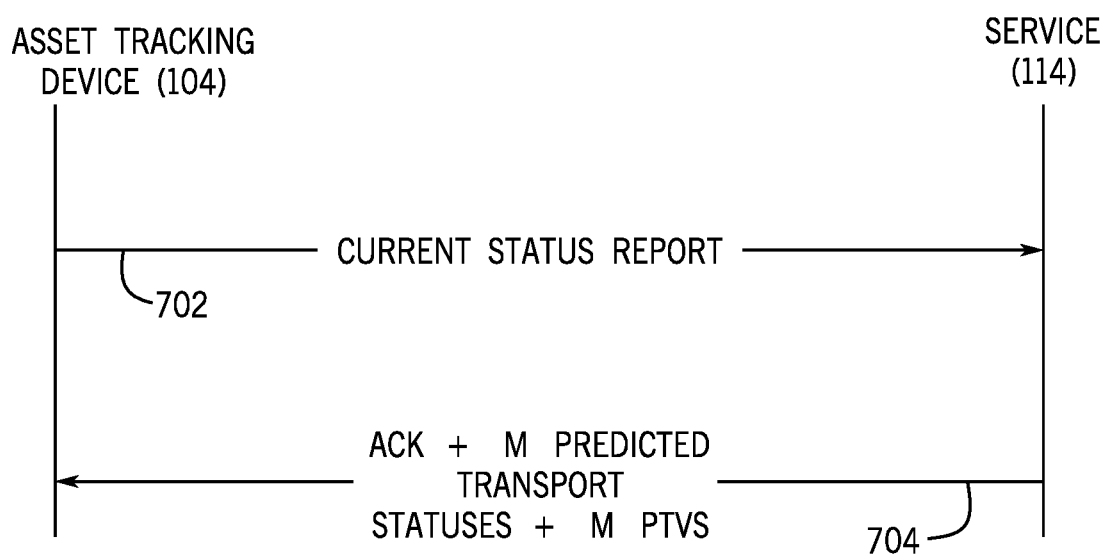

FIG. 7 shows an example where predicted transport statuses are generated by the service 114. In response to receiving (at 702) a current status report (containing an actual current transport status) from the asset tracking device 104, the service 114 responds by generating one or more (up to M) predicted transport statuses, and sends (at 704) the M predicted transport status(es) to the asset tracking device 104 (along with or as part of an acknowledgment message, ACK, responsive to the current status report). The service 114 can also send PTVs corresponding to the M predicted transport statuses (one PTV per predicted transport status, where in some examples the PTV for a first predicted transport status can differ from the PTV for a second predicted transport status).

As an alternative, the PTVs may be generated by the asset tracking device 104 locally.

The generation of a predicted transport status can be based on one or some combination of the following factors: a time at which a current status report is to be sent, a transport status at a time when the predicted transport status is generated, a prior transport status of the asset, a location of the moveable platform, a planned route of the asset, a speed restriction along the planned route, information of traffic along the planned route, a speed of the moveable platform, a restriction on a speed of the moveable platform, a direction of travel of the moveable platform, and weather information.

5. System Architecture

Figure 8:
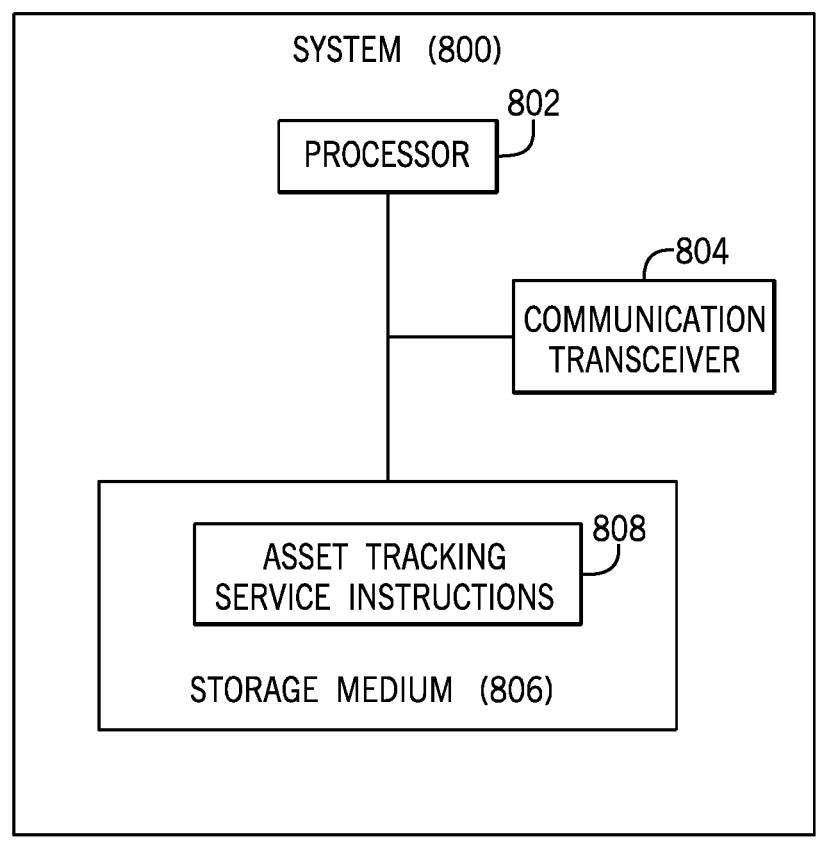
FIG. 8 is a block diagram of an example system according to some implementations.

FIG. 8 shows an example of a system 800, which can be implemented with a computer or multiple computers. The system 800 can be used to implement the service 114 discussed above. The system 800 includes a processor (or multiple processors) 802. In addition, the system 800 includes a communication transceiver 804 to communicate over a network, and a non-transitory machine-readable or computer-readable storage medium 806 that stores machine-readable instructions 808, such as asset tracking service instructions of the service 114, for execution on the processor(s) 802 to perform the tasks of the service 114 discussed herein.

The storage medium 806 can any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A device comprising:
   a battery;
   a wireless communication transceiver powered by the battery; and
   at least one processor powered by the battery and configured to:
   compare, at the device, a current transport status of an asset to a predicted transport status of the asset at each respective time instance of a plurality of time instances, wherein the asset is cargo being transported on a moveable platform, the current transport status of the asset including a current expected time of arrival of the asset, and the predicted transport status of the asset including a previously predicted expected time of arrival of the asset;
   in response to determining, based on the comparing at a first respective time instance of the plurality of time instances, that the current transport status of the asset differs from the predicted transport status of the asset by greater than a specified threshold, control the wireless communication transceiver to transition from a lower power mode to a higher power mode in order to send a report relating to the current transport status of the asset to a service over a network; and
   in response to determining, based on the comparing at a second respective time instance of the plurality of time instances, that the current transport status of the asset does not differ from the predicted transport status of the asset by greater than the specified threshold, control the wireless communication transceiver to transition from the higher power mode to the lower power mode in order to refrain from sending the report relating to the current transport status of the asset to the service.

2. The device of claim 1, wherein each of the current transport status of the asset and the predicted transport status of the asset is represented by one or more metrics.

3. The device of claim 1, wherein the current transport status of the asset includes a current location of the asset, and the predicted transport status of the asset includes a predicted location of the asset.

4. The device of claim 3, wherein the report includes the current location of the asset.

5. The device of claim 1, wherein the report includes the current expected time of arrival.

6. The device of claim 1, wherein the at least one processor is further configured to:
   detect that a current time is a scheduled time to send the report; and
   in response to detecting that the current time is the scheduled time, awaken a global positioning system (GPS) receiver to acquire GPS information to determine a current location of the asset,
   wherein the comparing and the controlling are performed by the at least one processor after the GPS information is acquired.

7. The device of claim 1, wherein the at least one processor is further configured to:
   in response to determining that the current transport status of the asset differs from the predicted transport status of the asset by greater than the specified threshold:
   detect that the device is out of network coverage,
   in response to detecting that the device is out of network coverage, maintain the wireless communication transceiver in the higher power mode, after controlling the wireless communication transceiver, to wait for availability of the network coverage,
   wherein the sending of the report is responsive to detecting the availability of the network coverage.

8. The device of claim 1, wherein the at least one processor is further configured to calculate the predicted transport status of the asset.

9. The device of claim 8, wherein the at least one processor is further configured to calculate the predicted transport status of the asset based on one or more of:
   a time at which the report relating to the current transport status of the asset is to be sent, a planned route of the asset,
   a speed restriction along the planned route, information of traffic along the planned route, a speed of the moveable platform, and
   a restriction on the speed of the moveable platform, a direction of travel of the moveable platform, and weather information.

10. The device of claim 1, wherein the at least one processor is further configured to calculate a configurable number of predicted transport statuses of the asset, the configurable number being variable as a function of one or more factors.

11. The device of claim 1, wherein the at least one processor is further configured to receive, over the network, the predicted transport status of the asset calculated by the service.

12. The device of claim 1, wherein the specified threshold is variable over time based on one or more factors selected from among:
- a level of the battery,
- a safety status of a region where the device is located,
- an expected availability of network coverage for the device, proximity of the device to a destination, and
- a speed of the device, and wherein the at least one processor is further configured to receive, at the device over the network, different values of the specified threshold over time as the one or more factors change.

13. A method of a device, comprising:
comparing a current transport status of an asset to a predicted transport status of the asset at each respective time instance of a plurality of time instances, wherein:
- the asset is cargo being transported on a moveable platform; and
- the current transport status of the asset includes a current expected time of arrival of the asset, and the predicted transport status of the asset includes a previously predicted expected time of arrival of the asset;

in response to determining, based on the comparing at a first respective time instance of the plurality of time instances, that the current expected time of arrival of the asset differs from the previously predicted expected time of arrival of the asset by greater than a specified threshold, control a communication transceiver of the device to transition from a lower power mode to a higher power mode in order to send a report relating to the current transport status of the asset to a service over a network; and in response to determining, based on the comparing at a second respective time instance of the plurality of time instances, that the current expected time of arrival of the asset does not differ from the previously predicted expected time of arrival of the asset by greater than the specified threshold, control the communication transceiver to transition from the higher power mode to the lower power mode in order to refrain from sending the report relating to the current transport status of the asset to the service.

14. The method of claim 13, wherein the specified threshold is dynamically variable based on one or more factors, and the method further comprising:
receiving, at the device from the service over the network using the communication transceiver of the device, the specified threshold, and
wherein the lower power mode is a power off mode of the communication transceiver.

15. The method of claim 13, further comprising:
detecting, at the device, that a current time is a scheduled time to send the report; and in response to detecting that the current time is the scheduled time, awakening a global positioning system (GPS) receiver of the device to acquire GPS information to determine a current location of the asset,
wherein the comparing and the controlling are performed after the GPS information is acquired.

16. A non-transitory machine-readable storage medium storing instructions that upon execution cause a device to:
compute a specified threshold based on a level of a battery in the device, wherein the computing comprises increasing the specified threshold based on detecting a reduced level of the battery;

compare a current transport status of an asset to a predicted transport status of the asset at each respective time instance of a plurality of time instances, wherein the asset is cargo being transported on a moveable platform, the current transport status of the asset including a current expected time of arrival of the asset, and the predicted transport status of the asset including a previously predicted expected time of arrival of the asset;

in response to determining, based on the comparing at a first respective time instance of the plurality of time instances, that the current transport status of the asset differs from the predicted transport status of the asset by greater than the specified threshold, control a communication transceiver of the device to transition from a lower power mode to a higher power mode in order to send a report relating to the current transport status of the asset to a service over a network; and in response to determining, based on the comparing at a second respective time instance of the plurality of time instances, that the current transport status of the asset does not differ from the predicted transport status of the asset by greater than the specified threshold, control the communication transceiver to transition from the higher power mode to the lower power mode in order to refrain from sending the report relating to the current transport status of the asset to the service.

17. The non-transitory machine-readable storage medium of claim 16, wherein the instructions upon execution cause the device to:
detect that a current time is a scheduled time to send the report; and
in response to detecting that the current time is the scheduled time, awaken a global positioning system (GPS) receiver of the device to acquire GPS information to determine a current location of the asset,
wherein the comparing and the controlling are performed after the GPS information is acquired.

18. The device of claim 1, wherein the device is configured to be mounted on the moveable platform.

* * * * *